Nov. 23, 1926.
W. L. ADAMS
FISHING REEL
Filed Nov. 25, 1922
1,608,287
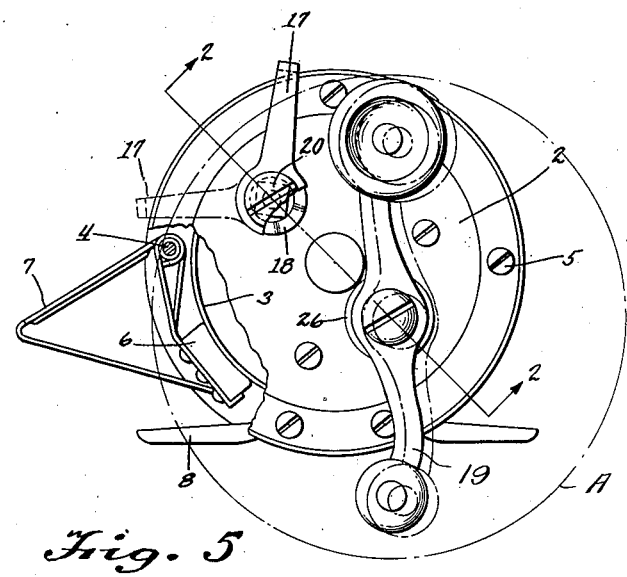
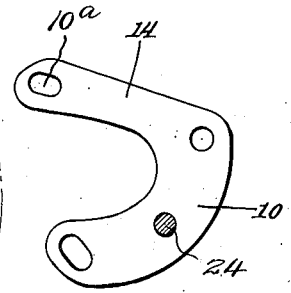
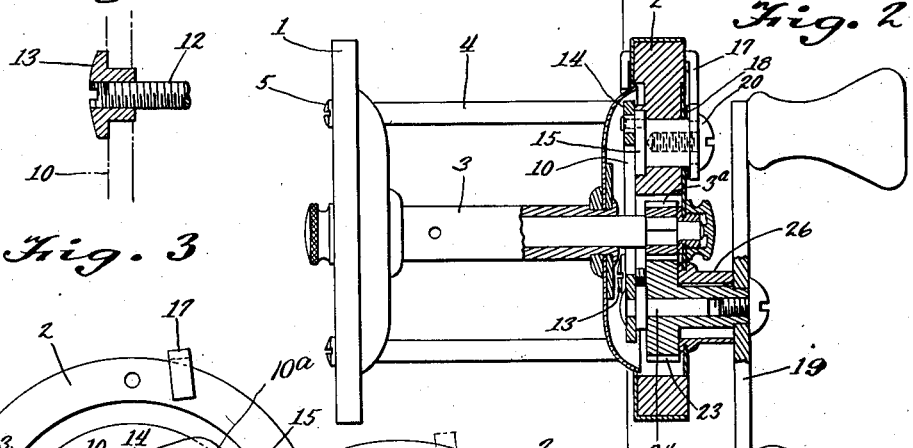
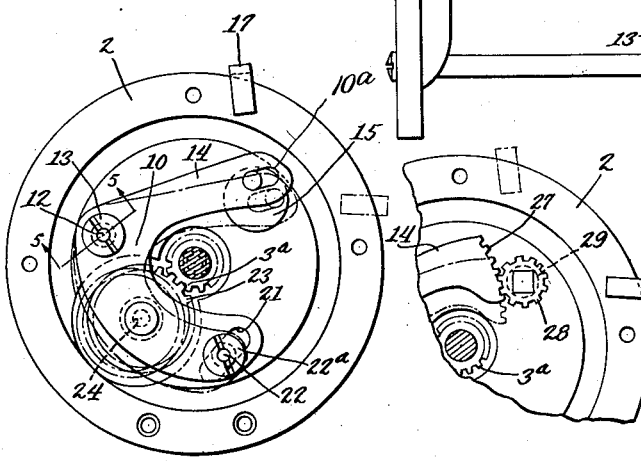

Patented Nov. 23, 1926.

1,608,287

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

FISHING REEL.

Application filed November 25, 1922. Serial No. 603,229.

This invention relates to improvements in fishing reels.

The object of this invention is to provide an improved fishing reel structure in which the spool can be operated either as a free spool or by means of the handle in the ordinary manner.

Another object of this invention is to provide an improved form of adjustment where10 by the spool can be set so as to operate either as a free spool or by means of the handle in the ordinary manner; furthermore to provide a lever for manipulating the adjusting means, such lever being so construct15 ed and arranged that it can be actuated by the operator without interference with the operating handle; and finally to provide such an adjustment with an operating lever having its end portion extended about the periphery of the end head on which it is mounted so as to be out of the zone or path of movement of the driving crank and also to preclude the possibility of the line being caught on the lever.

Other objects of the invention are in part obvious and in part will appear more in detail hereinafter.

Fig. 1 is an end view of my improved reel with a part broken away; Fig. 2 is a section on line 2—2 of Fig. 1; Fig. 3 is a section taken on line 3—3 of Fig. 2; Fig. 4 is a detail view of the bridge member; Fig. 5 is a detail view of the studs for the bridge member; and Fig. 6 is a partial view similar to Fig. 3 and showing a modification.

The end heads 1 and 2 within which the spool 3 is rotatably mounted are secured together in the ordinary manner by means of the pillars 4 and the screws 5. The brake 6 is pivotally mounted on one of the pillars and is adapted to bear against the end portions of the spool upon depression of the angular extensions 7. The curved plate by which the reel is attached to the fishing rod is indicated by reference numeral 8.

A two-armed lever member 10 is pivotally mounted at its angle upon the inner side of one of the end heads by means of the screw 12 and the nut 13. The straight arm 14 of the lever has a slot 10ª formed in its end portion to receive the crank pin 16 of the rotatable disc 15, the stub shaft 15ª of which extends through the same end head and is provided with a square outer end portion to receive the correspondingly shaped opening of the operating lever 17. A suitable spring washer 18, such as the radially corrugated washer shown is preferably provided between the operating lever 17 and the outer face of the end head so as to maintain the lever in set position and to take up wear. The lever is secured upon the crank member by means of the screw 20. The slot 21 is provided in the end portion of the curved arm of the lever 10 and is adapted to cooperate with the screw 22 which extends through the end head, the nut 22ª being provided upon the end of this screw. The gear 23 which is fixedly mounted upon the shaft of the operating handle 19 is adapted to rotate upon the post 24 fixedly mounted at a point substantially midway of the curved arm of the lever 10. The bearing 26 provided upon the end head and through which extends the shaft of the operating handle 19 is provided with an opening sufficiently large to permit adjusting movement of the gear.

These parts are so constructed and arranged that upon manipulation of the operating lever 17 to one limit of its movement the lever 10 will be rotated upon its pivot point in such a manner as to carry the gear 23 out of meshing engagement with the pinion 3ª on the shaft of the spool. In this position of the lever the spool is permitted to operate as a free spool. When however, it is desired to operate the spool by means of the handle in the ordinary manner, the lever 17 is moved to its other limit so as to swing the lever 10 about its pivot and bring the gear into meshing engagement with the pinion of the shaft of the spool. Operation on the handle will then cause rotation of the spool in the ordinary manner, the gear and pinion being locked in mesh by virtue of the fact that the crank pin is moved to a point beyond dead center.

It will be noted that the operating lever extends along the outer face of the end head and is bent at right angles so as to extend across the periphery of the head and is then again bent inwardly. Considering the reel as in use upon a rod pointing away from the fisherman, the driving gear 23 rotates upon an axis which is eccentric to the end head and is located forwardly, or away from the fisherman, and beneath the spool axis, while the axis of the rotatable disk 15 is rearwardly, or toward the operator, and above the spool axis. The zone or field of movement of the driving crank is indicated by a dot and dash line A, Fig. 1, and overlaps the side face of the end head except in the region of its edge rearwardly and upwardly of the spool axis, the operating lever 17 for shifting the gear having its manipulating part movable along this particular part of the edge of the end head. In other words, the gear shifting device is operated by a part which is movable entirely outside the zone or path of movement of the driving crank and can therefore be manipulated by either hand of the operator without any interference with or by the driving crank. Also, the operating end of lever 17 is so arranged as to avoid both interference with the line and any possibility of being bent or otherwise injured.

In Fig. 6 there is shown a modified form in which a segmental gear 27 is provided on the end of arm 14 for actuation by the pinion 28 carried by the shaft 29 upon which the lever is mounted in the same manner as in the first form. The manner of operation in the second form is the same as in the first form, manipulation of the lever causing the pinion 28 through the gear segment 27 to adjust the arm 14 about its pivot.

What I claim is:—

1. A fishing reel, comprising end heads, a spool rotatable therebetween and provided at one end with a pinion, a lever pivoted on one of said heads and carrying a driving gear adapted by movement of said lever to be connected to or disconnected from said pinion, said lever being provided with a substantially radially extending slot, and an operating crank for said lever pivoted in the end head on an axis at the same distance from the lever center as one end of said slot and having a crank pin working in said slot and so arranged that in meshing position of said gear and pinion a line through the crank pin and crank center is substantially normal to a line through the crank pin and lever center.

2. A fishing reel, comprising end heads, a spool rotatable therebetween and provided at one end with a pinion, a two-armed substantially L-shaped lever pivoted at its angle on one of said heads, a driving gear carried by one arm of said lever with its axis eccentric to the end head and adapted by movement of said lever to be connected to or disconnected from said pinion, the other arm of said lever being provided with a substantially radially extending slot, an operating crank for said lever pivoted in said end head on an axis at substantially the same distance from the lever center as one end of said slot and provided with a crank pin working in said slot, the parts being so arranged that in meshing position of said gear and pinion a line through the crank pin and crank center is substantially normal to a line through the crank pin and lever center and in free spool position of said gear and pinion the crank pin is more remote than the crank center from the lever center.

3. A fishing reel, comprising end heads, a spool rotatable therebetween and provided at one end with a pinion, a lever pivoted on one of said end heads and carrying a driving gear adapted by swinging movement of said lever to be moved into and out of meshing engagement with said pinion, means for preventing further movement of said lever in the gear meshing direction when said gear and said pinion are in meshing engagement, said lever being provided with a substantially radially extending slot, and an operating crank for said lever pivoted in said end head and having a crank pin working in said slot and so arranged that in meshing engagement of said gear and said pinion a line through the crank pin and the crank center is substantially normal to a line through the crank pin and the lever center.

In testimony whereof I hereby affix my signature.

WALTER L. ADAMS.